Jan. 14, 1964  J. HENCHERT  3,117,702
POURING NOZZLE WITH CAPTIVE CAP
Filed Feb. 3, 1960  2 Sheets-Sheet 1

INVENTOR.
JOHN HENCHERT
BY
Mason, Porter, Diller & Stewart
ATTORNEYS

Jan. 14, 1964   J. HENCHERT   3,117,702
POURING NOZZLE WITH CAPTIVE CAP
Filed Feb. 3, 1960   2 Sheets-Sheet 2
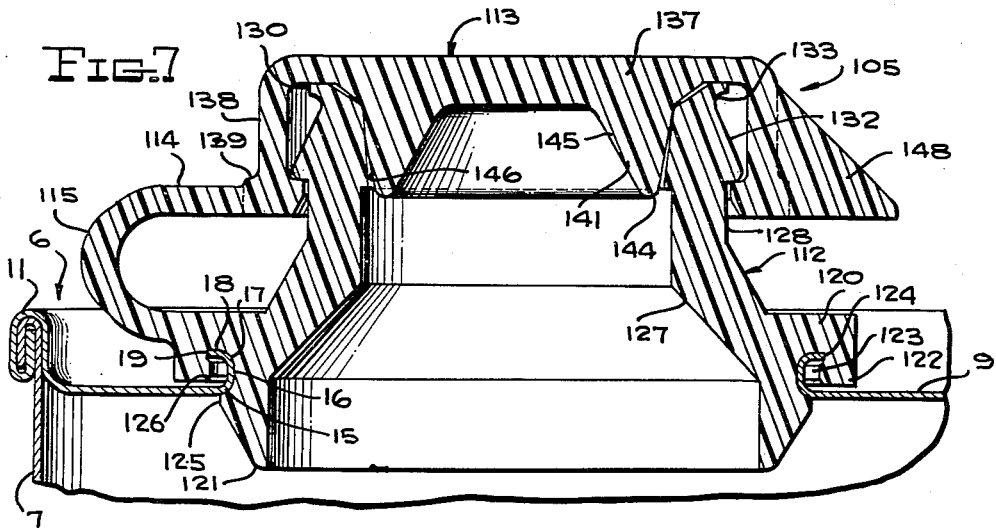
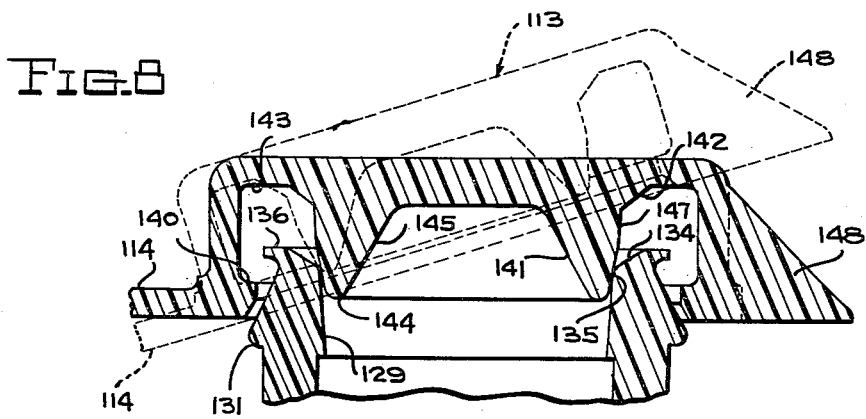
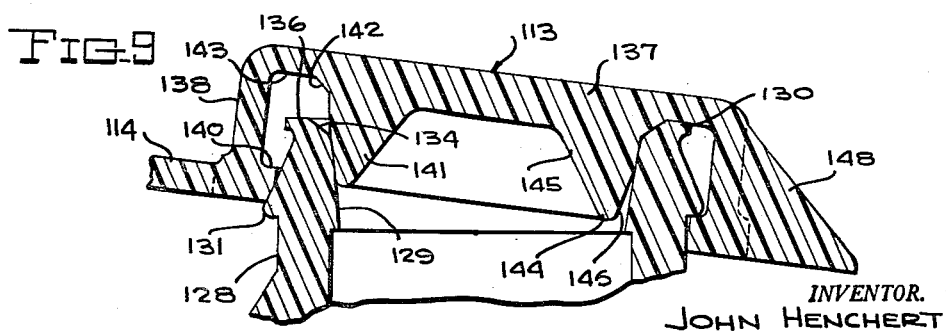
INVENTOR.
JOHN HENCHERT
BY
Mason, Porter, Diller & Stewart
ATTORNEYS

United States Patent Office 3,117,702
Patented Jan. 14, 1964

3,117,702
POURING NOZZLE WITH CAPTIVE CAP
John Henchert, River Forest, Ill., assignor to Continental
Can Company, Inc., New York, N.Y., a corporation of
New York
Filed Feb. 3, 1960, Ser. No. 6,458
9 Claims. (Cl. 222—543)

The invention generally relates to dispensing means for containers, and primarily seeks to provide a novel pouring nozzle having a captive cap.

This application constitutes a continuation-in-part of my copending application, Serial No. 804,639, filed April 7, 1959.

In many instances, plastic nozzles are formed as part of containers for liquids which include solvents, which solvents will permeate the plastic nozzle and cause swelling thereof. This is true in certain types of detergents and other liquids which are presently being distributed in containers having plastic pouring nozzles. When the solvent permeates the neck portion of the plastic nozzle, the swelling thereof in many instances is such as to prevent the removal of the plastic cap.

It is therefore another object of the invention to provide a plastic pouring nozzle and cap assembly wherein sufficient clearance is provided between telescoped portions of the plastic nozzle and cap so that in the event the plastic nozzle should be permeated by a solvent and the like and the plastic nozzle swell within the cap, there will be sufficient space within which the plastic nozzle may swell so as to prevent the wedging of the nozzle within the cap.

Molded plastic parts must be formed with a relatively high tolerance. As a result, the desired seal is not always obtained between a plastic nozzle and a plastic cap. It is therefore another object of this invention to provide a plastic nozzle and cap assembly wherein the nozzle includes a generally cylindrical neck portion and the cap includes a wedge-shaped cross-sectional plug which is movable down into the neck portion to form a seal therewith, the exterior diameter of the plug being greater than the interior diameter of the neck portion whereby when the plug is forced into place, it will frictionally engage the surface of the throat of the neck portion and form the desired seal therewith.

Still another object of the invention is to provide a novel pouring nozzle and cap assembly wherein the neck portion of the nozzle includes a generally cylindrical throat and the cap has a wedge-shaped cross-sectional annular plug which extends down into the throat to form a seal therewith, the upper part of the nozzle being flared outwardly from the throat and the plug being also flared outwardly adjacent its intersection with the top wall of the cap, the flare of the nozzle being at a greater angle to the axis of the throat than the flare of the plug, whereby full seating of the plug within the throat is assured.

In many instances, caustic materials and other liquids harmful to metal and certain types of coatings applied to metal are packaged in cans of the type including upper ends provided with pouring nozzles. Unless a complete seal between the can end and the plastic nozzle is formed, the raw edge of the can end will be attacked by the contents of the can due to the leakage of the contents through the space between the can end and the pouring nozzle. Also, often the liquid will seep through the connection between the can end and the nozzle, and will seep out onto the upper surface of the can end so as to destroy the enamel or similar coating of the can end.

In view of the foregoing, it is a further object of the invention of provide a novel connection between a can end and a plastic dispensing nozzle, the connection being of such a nature that the raw edge of the can end is sealed with respect to the lower part of the plastic nozzle, and thus the contents of the can are not free to attack either the exposed material of the raw edge of the can end or the enamel and similar coatings on the outer surface of the can end.

A still further object of the invention is to provide a novel plastic nozzle for the dispensing of liquids from containers, the plastic nozzle being of the pouring type and being initially sealed against the dispensing of liquid from the container by a diaphragm disposed within the neck portion thereof, the diaphragm being integrally formed with the remainder of the plastic nozzle and having a peripheral tear line immediately adjacent its connection to the neck portion of the nozzle to facilitate its removal, the diaphragm being further provided with a centrally located tool receiving slot through which a tool may be readily passed to facilitate the twisting and removal of the diaphragm.

Yet another object of the invention is to provide a novel container construction which includes a pouring nozzle having a closure cap, the container being provided with a bottom end wall which is upwardly recessed so as to clear the pouring nozzle and cap of a similar container, whereby the containers may be stacked one upon the other.

Although an efficient connection may be made between a closure cap and a pouring nozzle when the closure cap is properly placed on the pouring nozzle, a problem exists in that oftentimes the housewife or other user of a container having a pouring nozzle and captive closure cap merely pushes on one side of the closure cap, and therefore, the closure cap assumes a partially interlocked, cocked position. With presently known closure cap and pouring nozzle assemblies, when the closure cap is not properly positioned on the pouring nozzle, a seal is not effected even through the closure cap appears to be locked in place.

It is therefore still another object of this invention to provide a closure cap and pouring nozzle arrangement which is of a nature that a seal is effected even if the closure cap is not fully seated on the pouring nozzle.

A still further object of the invention is to provide a novel pouring nozzle to closure cap connection which includes a pouring nozzle formed of a resilient plastic material and having a generally cylindrical throat terminating at the upper end thereof in an outwardly flared seat, the pouring nozzle also having an outer annular locking rib, the closure cap having an inwardly projecting locking rib adapted to engage beneath the locking rib of the pouring nozzle to retain the closure cap in position, the closure cap also having a depending plug which is tapered and which has a force fit within the throat of the pouring nozzle, the closure cap further having a tapered seating portion adapted to engage the seat of the pouring nozzle, the relationship of the various components of the pouring nozzle and the closure cap being such that when a portion of the locking flange of the closure cap is engaged beneath the outwardly projecting flange of the pouring nozzle, the plug portion of the closure cap will engage the pouring nozzle throat remote from the interlock between the closure cap and the pouring nozzle to effect the required seal while the seating surface and seat will be in opposed sealing relation where the seal is not formed by the plug, thereby assuring a complete seal all the way around the pouring nozzle.

Yet another object of the invention is to provide a pouring nozzle and captive cap assembly wherein the pouring nozzle and captive cap are connected together by a connecting strap, the connecting strap having a thickened intermediate portion so that when the closure cap is not locked on the pouring nozzle, the connecting strap will forcibly lift the closure cap off of the pouring nozzle and indicate the fact that the closure cap is not locked in place.

A further object of the invention is to provide a closure cap and pouring nozzle assembly wherein the pouring nozzle is provided at the upper end thereof with an outwardly directed pouring lip and the lower portion thereof is provided with an annular locking rib, and the closure cap is provided with an inwardly directed annular locking rib intended to be locked beneath the locking rib of the pouring nozzle, the closure cap being provided with a tapered plug for insertion in the throat of a pouring nozzle to assure the centering of the closure cap and thereby eliminating any possibility of the locking rib of the closure cap engaging with the pouring lip to falsely indicate that the closure cap is locked in place on the pouring nozzle.

With the above and other objects in view that will hereinafter appear, the nature of the invention will be more clearly understood by reference to the following detailed description, the appended claims, and the several views illustrated in the accompanying drawings.

In the drawings:

FIGURE 7 is an enlarged fragmentary vertical sectional view taken through an upper portion of a container having a modified form of closure cap and pouring nozzle assembly.

FIGURE 8 is a fragmentary vertical sectional view taken through an upper portion of the pouring nozzle and through the closure cap of FIGURE 7, and shows the closure cap initially being positioned with respect to the pouring nozzle by dotted lines, and showing an initial centered position of the closure cap with respect to the pouring nozzle in solid lines.

FIGURE 9 is a fragmentary vertical sectional view taken through the upper portion of the pouring nozzle and closure cap assembly of FIGURE 7, and shows the closure cap in a cocked or canted position with respect to the pouring nozzle, and the manner in which the closure cap seals the pouring nozzle when in this canted position.

Figure 1:
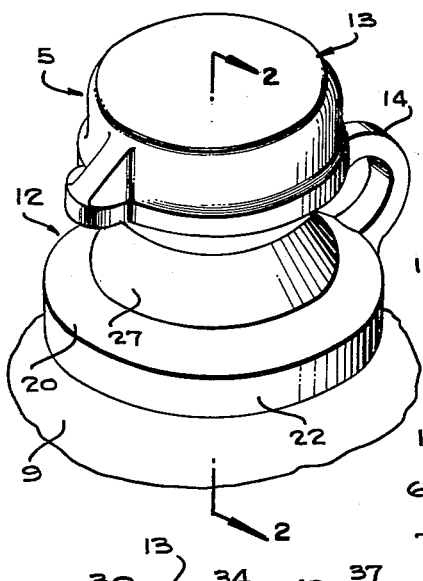
FIGURE 1 is a perspective view of the top portion of a can employing the plastic pouring nozzle and captive cap and shows the general arrangement thereof.

In the example of embodiment of the invention herein disclosed, the pouring nozzle and captive cap assembly is generally referred to by the numeral 5, and is mounted on a can, generally referred to by the numeral 6. The can 6 includes a can body 7, a bottom end 8, and a top end 9. The bottom end 8 is secured to the lower end of the can body 7 by a double seam 10 of the conventional type. A similar double seam 11 is utilized to secure the top end 9 to the upper end of the can body 7.

The pouring nozzle and captive cap assembly 5 is integrally formed of a suitable plastic, such as polyethylene. The pouring nozzle and captive cap assembly 5 includes a pouring nozzle, generally referred to by the numeral 12, and a captive cap, generally referred to by the numeral 13, the cap 13 being permanently connected to the pouring nozzle 12 by an integral strap 14.

Figure 2:
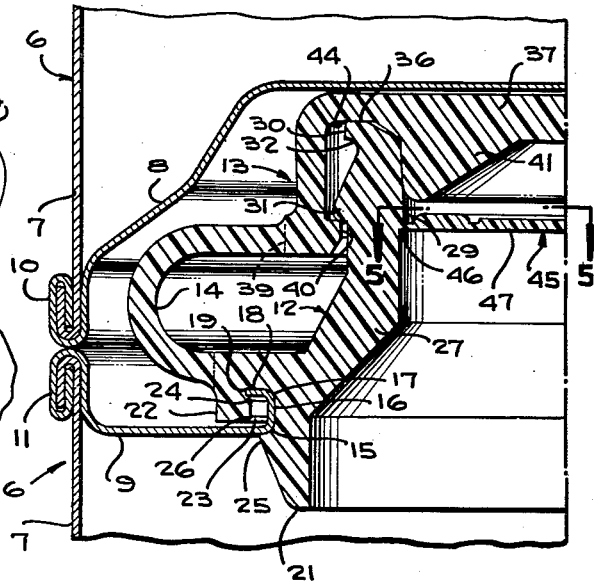
FIGURE 2 is an enlarged fragmentary vertical sectional view, taken substantially upon the section line 2—2 of FIGURE 1, and shows the specific details of the pouring nozzle, the captive closure cap and the relationship of the pouring nozzle to the top end of the container, a second container being shown in a stacked position on the first container.
Figure 3:
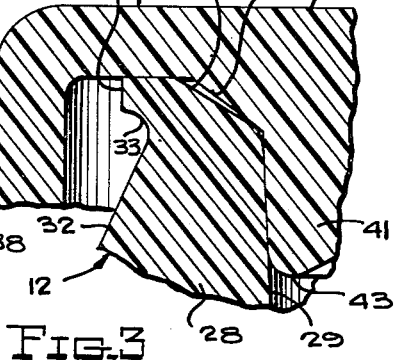
FIGURE 3 is an enlarged fragmentary sectional view showing the upper part of the nozzle and an associated part of the closure cap, and shows the relationship between flared portions of both the pouring nozzle and the closure cap.

As is best shown in FIGURE 2, the inner portion of the top container end 89 is upwardly curved, as at 15, and has an integral portion in the form of an upstanding circular flange 16. The upper edge of the flange 16 terminates in a curved portion 17, which, in turn, terminates in a generally horizontal outwardly directed annular flange 18 having a free or raw edge 19.

A lower portion of the pouring nozzle 12 is in the form of an annular base 20. A tubular extension 21 extends downwardy from the annular base adjacent the inner edge thereof. A circumferential flange 22 also depends from the base 20, the circumferential flange 22 being disposed outwardly of the tubular extension 21 and concentric to the tubular extension 21 to define, in conjunction with the tubular extension 21, an annular channel 23 which opens downwardly.

As is best shown in FIGURE 2, the flanges 16 and 18 of the top can end 9 are received in the annular channel 23. The upper part of the circumferential flange 22 has an inwardly directed annular seat 24 formed therein. The raw edge 19 is compressively engaged with the seat 24 and forms a seal therewith. Also, those portions of the flanges 16 and 18 facing the underside of the base 20 and the tubular extension 21 are in compresive engagement therewith to further form a seal between the pouring nozzle 12 and the can 6.

The tubular extension 21 has a projecting part 25 which underlies the annular channel 23 and engages the underside of the top can end 9 adjacent the curved portion 15. This engagement prevents the upward movement of the pouring nozzle 12 with respect to the can 6. It also prevents the jack-knifing of the pouring nozzle 12 out of the can top end 9.

A lower inner corner of the circumferential flange 22 is removed, as at 26, to facilitate the telescoping of the flanges 16 and 18 into the annular channel 23. Further, since the pouring nozzle 12 is formed of a resilient plastic material, such as polyethylene, it will be seen that portions of the pouring nozzle 12 may be deformed to permit the insertion of the flanges 16 and 18 into the annular channel 23.

The pouring nozzle 12 also includes a generally frusto-conical intermediate portion 27 which is formed integral with the base 20, and which extends upwardly from the base 20. The intermediate portion 27 terminates at its upper end in a generally cylindrical neck portion 28. An inner upper surface of the neck portion 28 defines a generally cylindrical throat 29. A non-drip pouring lip 30 projects outwardly from the upper end of the neck portion 28. A locking rib 31 projects outwardly from the exterior surface of the neck portion 28 intermediate the ends thereof. The locking rib 31 is annular and is curved in cross-section. It is to be noted that the exterior of the neck portion 28 slopes upwardly and inwardly in a straight line from the locking rib 31 to a point inwardly of the outer edge of the pouring lip 30. This outer surface of the neck portion 28 is generally frusto-conical, and is referred to by the numeral 32. The outer surface 32 is connected to a circumferential surface of the pouring lip 30 by a curved portion 33.

The throat 29 terminates at its upper end in an outwardly flared surface 34. The outwardly flared surface 34 extends to the upper end of the pouring nozzle 12, and is connected to the surface defining the throat 29 by a curved part 35. The extreme upper end of the pouring nozzle 12 is in the form of an annular seat 36 which surrounds the outwardly flared surface 34 and forms an upper part of the pouring lip 30.

The captive or closure cap 13 includes a generally circular end wall 37 and a cylindrical body wall 38. The lower end of the body wall 38 is thickened, both inwardly and outwardly, to define an outwardly projecting annular part 39 and an inwardly projecting annular locking rib 40. The connecting strap 14 is integrally connected to the part 39 at one end and to portions of the base 20 and the circumferential flange 22 at the other end. When the closure cap 13 is in place, the locking rib 40 underlies the locking rib 31 to retain the closure cap 13 in place on the pouring nozzle 12.

An annular wedge-shaped plug 41 is formed on the underside of the end wall 37. The upper and outer part of the plug 41 is outwardly flared, as at 42, immediately adjacent its intersection with the underside of the end wall 37. The extreme lower end of the plug 41 is rounded, as at 43, to facilitate the passage of the plug 41 down into the throat 29. A downwardly directed annular seat 44 is formed on the underside of the end wall 37 surrounding the flared portion 42 of the plug 41.

Figure 4:
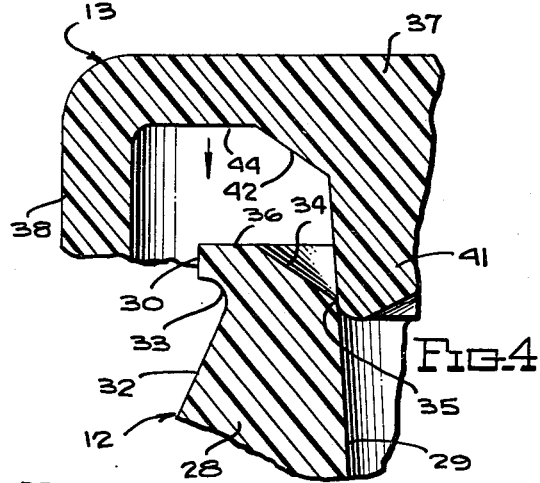
FIGURE 4 is an enlarged fragmentary sectional view showing the upper part of the pouring nozzle and a lower portion of the closure cap, with the plug of the closure cap in position for entering the throat of the nozzle.

At this time, it is pointed out that the diameter of the external surface of the plug 41 is of a greater dimension than the diameter of the internal surface of the throat 29. This is best illustrated in FIGURE 4. However, since both the pouring nozzle 12 and the closure cap 13 are formed of deformable plastic, the plug 41 may be forced down into the throat 29 so that there will be an intimate frictional contact between the plug 41 and the throat 29 of the neck portion 28.

It is also pointed out that the angle of the flared portion 42 of the plug 41 with respect to the axis of the throat 29 is less than the angle of the flared portion 34. Further, there is a sharp corner between the flared portion 42 and the exterior surface of the plug 41. In actual practice, the angle of the flared portion 34 to the horizontal or an axis transverse of the longitudinal axis of the throat 29 is 30°, whereas the angle of the flared portion 42 is 35°. In view of the relationship between the flared portions 34 and 42, there is no interference that will prevent the plug 41 from being disposed in its full in position in relation to the neck portion 28. Further, this relationship permits the sealing surface or seat 44 to come into sealing contact with the annular seat 36 of the pouring nozzle 12.

The pouring nozzle 12 may also be provided with a sealing diaphragm, generally referred to by the numeral 45. The diaphragm 45, when incorporated in the pouring nozzle structure, will be disposed immediately below the throat 29 and will seal the contents of the can 6. It is intended that the diaphragm 45 be removed by the ultimate user of the contents of the can 6. Accordingly, the diaphragm 45 is connected to the interior surface of the neck portion 28 by a very thin annular portion 46. This annular portion 46 may be readily ruptured to facilitate the removal of the diaphragm 45.

Figure 5:
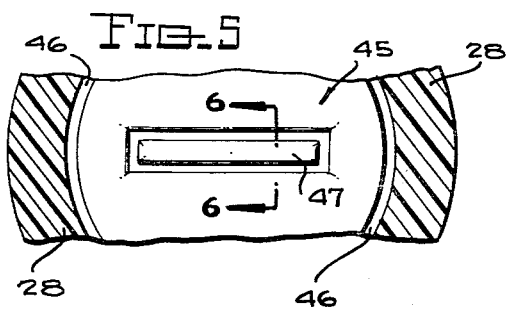
FIGURE 5 is an enlarged fragmentary horizontal sectional view, taken along the line 5—5 of FIGURE 2, and shows the general configuration of a tool receiving weakened portion of the diaphragm to facilitate the removal of the diaphragm.
Figure 6:
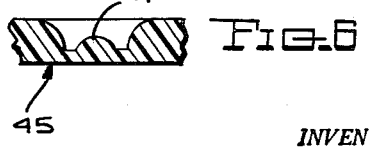
FIGURE 6 is an enlarged fragmentary sectional view, taken along the section line 6—6 of FIGURE 5, and shows the general cross-section of the weakened portion of the the diaphragm.

The central part of the diaphragm 45 is provided with a narrow elongated readily penetratable portion 47. The general outline of the penetratable portion 47 is illustrated in FIGURE 5, and the cross-section thereof is illustrated in FIGURE 6. It is intended that a suitable tool, such as a screwdriver or the like, be used to penetrate the diaphragm 45 through the penetratable portion 47. Once the blade of the screwdriver or similar tool has penetrated the diaphragm 45, the blade may be twisted so as to twist the diaphragm 45 and break the diaphragm 45 away from the neck portion 28 along the reduced annular portion 46. The diaphragm 45 may then be removed from the pouring nozzle 12 and the pouring nozzle 12 is ready for the dispensing of the contents of the can 6.

At this time, it is pointed out that the diaphragm 45 has no effect whatsoever on the relationship between the pouring nozzle 12 and the closure cap 13. The diaphragm 45 is disposed below the farthest in position of the plug 41 and does not prevent the outward deflection of the neck portion 28 required for the reception of the plug 41. Further, when the diaphragm 45 has been removed from the pouring nozzle 12, it does not interfere with the flow of liquid through the pouring nozzle 12.

In FIGURES 7, 8 and 9, there is illustrated a modified form of pouring nozzle and captive cap assembly, which is generally referred to by the numeral 105. The pouring nozzle and captive cap assembly 105 is mounted on the can 6, and includes a pouring nozzle, generally referred to by the numeral 112, and a captive cap, generally referred to by the numeral 113, the cap 113 being permanently connected to the pouring nozzle 112 by an integral strap 114. The strap 114 has a thickened intermediate portion 115, the purpose of which will be described in detail hereinafter.

A lower portion of the pouring nozzle 112 is in the form of an annular base 120. A tubular extension 121 extends downwardly from the annular base adjacent the inner edge thereof, and a circumferential flange 122 depends from the base 120, the circumferential flange 122 being disposed outwardly of the tubular extension 121 and concentric thereto to define, in conjunction with the tubular extension 121, an annular channel 123 which opens downwardly.

As is best shown in FIGURE 7, the flanges 16 and 18 of the can end 9 are received in the annular channel 123. The upper part of the circumferential flange 122 has an inwardly directed annular seat 124 formed therein. The raw edge 19 of the can is compressively engaged with the seat 124 and forms a seal therewith. Also, those portions of the flanges 16 and 18 facing the underside of the base 120 and the tubular extension 121 are in compressive engagement therewith to further form a seal between the pouring nozzle 112 and the can 6.

The tubular extension 121 has a projecting part 125 which underlies the annular channel 123 and engages the underside of the can end 9 adjacent the curved portion 15. This engagement prevents the upward movement of the pouring nozzle 112 with respect to the can 6. It also prevents the jack-knifing of the pouring nozzle 112 out of the can end 9.

A lower inner corner of the circumferential flange 122 is removed, as at 126, to facilitate the telescoping of the flanges 16 and 18 into the annular channel 123. Further, since the pouring nozzle 112 is formed of a resilient plastic material, such as polyethylene, it will be seen that portions of the pouring nozzle 112 may be deformed to permit the insertion of the flanges 16 and 18 into the annular channel 123.

The pouring nozzle 112 also includes a generally frusto-conical intermediate portion 127 which is formed integral with the base 120, and which extends upwardly from the base 120. The intermediate portion 127 terminates at its upper end in a generally cylindrical neck portion 128. An inner upper surface of the neck portion 128 defines a generally cylindrical throat 129. A non-drip pouring lip 130 projects outwardly from the upper end of the neck portion 128. A locking rib 131 projects outwardly from the interior surface of the neck portion 128 intermediate the ends thereof, the locking rib 131 being annular and curved in cross-section. It is to be noted that the exterior of the neck portion 128 slopes upwardly and inwardly in a straight line from the locking rib 131 to a point inwardly of the outer edge of the pouring lip 130. This outer surface of the neck portion 128 is generally frusto-conical, and is referred to by the numeral 132. The outer surface 132 is connected to a circumferential surface of the pouring lip 130 by a curved portion 133.

The throat 129 terminates at its upper end in an outwardly flared surface 134 which extends to the upper end of the pouring nozzle 112 and is connected to the surface defining the throat 129 by a curved part 135. The extreme upper end of the pouring nozzle 112 is in the form of an annular seat 136 which surrounds the outwardly flared surface 134 and forms an upper part of the pouring lip 130.

From the foregoing description of the pouring nozzle 112, it will be apparent that it is identical with the pouring nozzle 12 with the exception of the fact that the diaphragm 45 has been eliminated. If desired, the diaphragm 45 could be incorporated in the pouring nozzle 112, but would have to be placed lower down than that illustrated in FIGURE 2 for reasons which will be apparent hereinafter.

The captive or closure cap 113 includes a generally circular end wall 137 and a cylindrical body wall 138. The lower end of the body wall 138 is thickened, both inwardly and outwardly, to define an outwardly projecting annular part 139 and an inwardly projecting annular locking rib 140. The connecting strap 114 is integrally connected to the part 139 at one end and to portions of the base 120 and the circumferential flange 122 at the other end. When the closure cap 113 is in place, the locking rib 140 underlies the locking rib 131 to retain the closure cap 113 in place on the pouring nozzle 112.

An annular wedge-shaped plug 141 is formed on the underside of the end wall 137 in a centered position. The upper and outer part of the plug 141 is outwardly flared, as at 142, immediately adjacent its intersection with the underside of the end wall 137. A downwardly directed annular seat 143 is formed on the underside of the end wall 137 surrounding the flared portion 142 of the plug 141.

The plug 141 is generally V-shaped in cross-section, and terminates at its lower end in a rounded part 144. The inner surface of the plug 141 flares upwardly and inwardly, the surface being referred to by the numeral 145. The lower outer surface of the plug 141 is referred to by the numeral 146 and flares upwardly and outwardly. The surface 146 terminates at its upper end in a cylindrical upper outer surface 147.

At this time, it is pointed out that the diameter of the upper outer surface 147 of the plug 141 is of a greater dimension than the diameter of the internal surface of the throat 129. This is best illustrated in FIGURE 7, wherein the plug 141 has deformed the upper part of the throat 129 to assure a seal. However, since both the pouring nozzle 112 and the closure cap 113 are formed of deformable plastic, the plug 141 may be forced down into the throat 129 so there will be an intimate frictional contact between the plug 141 and the throat 129.

It is also pointed out that the angle of the flared portion 142 of the plug 141 with respect to the axis of the throat 129 is less than the angle of the flared portion 134. Further, there is a sharp corner between the flared portion 142 and the exterior surface of the plug 141. In actual practice, the angle of the flared portion 134 to the horizontal or axis transverse to the longitudinal axis of the throat 129 is 30°, whereas the angle of the flared portion 142 is 35°. In view of the relationship between the flared portions 134 and 142, there is no interference that will prevent the plug 141 from being disposed in its full in position in relation to the neck portion 128. Further, the relationship permits the sealing surface or seat 144 to come into sealing contact with the annular seat 136 of the pouring nozzle 112.

The fully closed position of the closure cap 113 with respect to the pouring nozzle 112 is illustrated in FIGURE 7. In FIGURE 8, the initial engagement of the closure cap 113 with the pouring nozzle 112 is illustrated in dotted lines. As the closure cap 113 is further moved into engagement with the pouring nozzle 112, the plug 141, due to its configuration, will center the closure cap 113 with respect to the pouring nozzle 112 and may assume an initial centered position, such as illustrated in full lines in FIGURE 8. If, during the replacement of the closure cap 113, the closure cap is left in the full line position of FIGURE 8, the thickened portion 115 of the connecting strap 114 will have sufficient resiliency and resistance to deformation to swing the closure cap 113 upwardly away from the pouring nozzle 112 to indicate that the closure cap is not in a pouring nozzle sealing position. Thus, any accidental interlocking of the retaining rib 140 with the pouring lip 130 to falsely indicate the sealing of the pouring nozzle is eliminated.

Reference is now made to FIGURE 9 in particular. It is to be noted that the closure cap 113 is provided with a projecting ear 148 in diametrically opposite relation with respect to the connecting strap 114. While this projecting ear 148 is intended to be used in unseating the closure cap 113 from the pouring nozzle 112, it is oftentimes used as a means for pushing the closure cap 113 down onto the pouring nozzle 112. As a result, oftentimes the closure cap is disposed in a cocked or canted position with respect to the pouring nozzle. The closure cap and pouring nozzle assembly normally being designed for full interlocking of the closure cap with the pouring nozzle will leak when the closure cap is not fully seated, but retained in a canted position. The specific arrangement of the components of the closure cap 113 and the pouring nozzle 112 eliminates this.

When the closure cap 113 is in a canted position on the pouring nozzle 112, as shown in FIGURE 9, that part of the locking rib 140 disposed adjacent the connecting strap 114 will be disposed above the locking rib 131, whereas that portion of the locking rib 140 disposed remote from the connecting strap 114 will engage beneath the locking rib 131. When the closure cap 113 is in this position, the locking engagement of the locking rib 140 with the locking rib 131 is sufficient to retain the closure cap in position.

Still referring to FIGURE 9, it will be seen that when the closure cap 113 is in a canted position, a seal is maintained between the plug 141 and the throat 129. The upper cylindrical outer surface 147 of the plug 141 will engage the upper portion of the throat 129 remote from the connecting strap 114. At the same time, the lower outer surface 146 of the plug 141 will engage the upper part of the throat 129 adjacent the connecting strap 114. Due to the fact that the plug 141 is of a larger diameter than the throat 129, the engagement of the upper outer surface 147 of the plug 141 with the throat 129 will result in a deformation of the throat 129 and the urging of the closure cap away from this area of contact to forcefully engage the lower portion of the plug 141 with other portions of the throat 129.

It is obvious that various changes in the details of construction, arrangement and proportion of parts may be made without departing from the spirit and scope of the invention, as defined in the appended claims.

I claim:

1. A deformable plastic nozzle and closure cap assembly, said nozzle having a neck portion, an outwardly directed annular pouring lip at the upper end of said neck portion, an outwardly directed locking rib on said neck portion and spaced below said pouring lip, said neck portion including a cylindrical throat, said closure cap including a top wall and a depending cylindrical wall portion, said wall portion being telescoped over said neck portion, an inwardly directed locking rib on said wall portion underlying said nozzle locking rib and retaining said closure cap on said nozzle, and an annular wedge-shaped cross-sectional plug depending from the underside of said top wall, said plug having a generally cylindrical inner portion of an exterior diameter greater than the diameter of said throat, whereby an intimate frictional contact between said plug and said throat is assured, said plug having an outwardly flared outer portion adjacent its connection to said top wall, and the upper end of said throat being outwardly flared, the flare of said throat being at a greater angle to the axis of said neck portion than said plug flare to assure the seating of said plug within said throat.

2. A deformable plastic nozzle and closure cap assembly, said nozzle having a neck portion, an outwardly directed annular pouring lip at the upper end of said neck portion, an outwardly directed locking rib on said neck portion and spaced below said pouring lip, said neck portion including a cylindrical throat, said closure cap including a top wall and a depending cylindrical wall portion, said wall portion being telescoped over said neck portion, an inwardly directed locking rib on said wall portion underlying said outwardly directed locking rib and retaining said closure cap on said nozzle, and an annular wedge-shaped cross-sectional plug depending from the underside of said top wall, said plug having an exterior diameter greater than the diameter of said throat, whereby an intimate frictional contact between said plug and said throat is assured, said plug having an outwardly flared outer portion adjacent its connection to said top wall, the upper end of said throat being outwardly flared with the angle of the throat flare to the axis of said throat being greater than the corresponding angle of said plug flare, said plug flare having a sharp intersection with the remainder of said plug to the axis of said plug, and the intersection between said throat flare and the remainder of said throat being rounded to assure the full depth seating of said plug within said throat.

3. The assembly of claim 2 wherein said top wall has a seating surface surrounding said plug flare and said nozzle upper end has a cooperating seating surface surrounding said throat flare.

4. A deformable plastic nozzle and closure cap assembly, said nozzle having a neck portion, an outwardly directed annular pouring lip at the upper end of said neck portion, an outwardly directed locking rib on said neck portion and spaced below said pouring lip, said neck portion including a cylindrical throat, said closure cap including a top wall and a depending cylindrical wall portion, said wall portion being telescoped over said neck portion, an inwardly directed locking rib on said wall portion underlying said nozzle locking rib and retaining said closure cap on said nozzle, and a connecting strap extending between and having ends connected to said closure cap and said nozzle, said connecting strap having a thickened intermediate portion as compared to the ends of the strap resisting bending of said connecting strap and urging said closure cap away from said nozzle to indicate a failure to lock said closure cap on said nozzle.

5. A deformable plastic nozzle and closure cap assembly, said nozzle having a neck portion, an outwardly directed annular pouring lip at the upper end of said neck portion, an outwardly directed annular locking rib on said neck portion and spaced below said pouring lip and having a center lying in a plane disposed normal to the axis of the neck portion, said neck portion including a cylindrical throat, said closure cap including a top wall and a depending cylindrical wall portion, said wall portion being telescoped over said neck portion, an inwardly directed continuous locking rib on said wall portion underlying said nozzle locking rib and retaining said closure cap on said nozzle, and a tapered plug means depending from the underside of said top wall for centering said closure cap relative to said nozzle and preventing unintended partial locking of said closure cap locking rib beneath said pouring lip.

6. A deformable plastic nozzle and closure cap assembly, said nozzle having a neck portion, an outwardly directed annular pouring lip at the upper end of said neck portion, an outwardly directed locking rib on said neck portion and spaced below said pouring lip, said neck portion including a cylindrical throat, said closure cap including a top wall and a depending cylindrical wall portion, said wall portion being telescoped over said neck portion, an inwardly directed locking rib on said wall portion underlying said nozzle locking rib and retaining said closure cap on said nozzle, a tapered plug depending from the underside of said top wall for centering said closure cap relative to said nozzle and preventing unintended partial locking of said closure cap locking rib beneath said pouring lip, and a connecting strap extending between and having ends connected to said closure cap and said nozzle, said connecting strap having a thickened intermediate portion as compared to the ends of the strap resisting bending of said connecting strap and urging said closure cap away from said nozzle to indicate a failure to lock said closure cap on said nozzle.

7. A deformable plastic nozzle and closure cap assembly, said nozzle having a neck portion, an outwardly directed locking rib on said neck portion, said neck portion including a cylindrical throat, said closure cap including a top wall and a depending cylindrical wall portion, said wall portion being telescoped over said neck portion, an inwardly directed locking rib on said wall portion underlying said nozzle locking rib and retaining said closure cap on said nozzle, and an annular wedge-shaped cross-sectional plug depending from the underside of said top wall, said plug having an exterior diameter greater than the diameter of said throat with said plug expanding said throat, whereby an intimate frictional contact between said plug and said throat is assured, said plug having a lower end, an outwardly and upwardly flared lower outer surface above said lower end, and a cylindrical upper outer surface, whereby sealing engagement between said plug and said throat occurs even when said closure cap is canted relative to said nozzle.

8. In a container of the type having a pouring nozzle, a nozzle-to-container connection comprising a container end formed of thin sheet material and having an upstanding circular flange defining an opening, said upstanding circular flange terminating in a generally horizontal outwardly directed annular flange having a free edge, said nozzle including an integral annular base, a tubular extension extending down from said base, an integral circumferential flange depending from said base outwardly of said tubular extension and concentric thereto to define a downwardly opening annular channel of a width greater than the thickness of said sheet material, and an inwardly directed annular seat formed in the upper part of said circumferential flange in the inner surface thereof, said upstanding circular flange and said outwardly directed annular flange being seated in said annular channel and said free edge being seated on said seat in sealed engagement therewith, whereby said free edge is protected, said tubular extension having an outwardly directed projection underlying said annular channel and retaining said container end upstanding circular flange and said container end horizontally outwardly directed annular flange within said annular channel, said circumferential flange having a lateral inwardly directed protrusion extending beneath said outwardly directed annular flange and terminating in spaced relation to said upstanding circular flange.

9. In a container of the type having a pouring nozzle, a nozzle-to-container connection comprising a container end formed of thin sheet material having an upstanding circular flange defining an opening, said upstanding circular flange terminating in a generally horizontal outwardly directed annular flange having a free edge, said nozzle including an annular base seated on said container end, a tubular extension extending down from said base, a circumferential flange depending from said base outwardly of said tubular extension and concentric thereto to define a downwardly opening annular channel of a width greater than the thickness of said sheet material, said upstanding circular flange and said outwardly directed annular flange being seated in said annular channel, and an outwardly directed projection on said tubular extension underlying said annular channel and engaging said container end to retain said container end upstanding circular flange and said container end horizontally outwardly directed annular flange within said annular channel, said circumferential flange having a lateral inwardly directed protrusion extending beneath said outwardly directed annular flange and terminating in spaced relation to said upstanding circular flange.

References Cited in the file of this patent

UNITED STATES PATENTS

| | | |
|---|---|---|
| 2,006,963 | Rollason | July 2, 1935 |
| 2,068,988 | Knell | Jan. 26, 1937 |
| 2,571,227 | Yue San Fong | Oct. 16, 1951 |
| 2,661,128 | Rieke | Dec. 1, 1953 |
| 2,774,523 | Rieke | Dec. 18, 1956 |
| 2,786,597 | Benson | Mar. 26, 1957 |
| 2,789,717 | Demke | Apr. 23, 1957 |
| 2,815,894 | Henchert | Dec. 10, 1957 |
| 2,823,837 | Heinle | Feb. 18, 1958 |
| 2,831,600 | Powers | Apr. 22, 1958 |
| 2,932,436 | Dobbins | Apr. 12, 1960 |
| 2,987,223 | Armour | June 6, 1961 |
| 3,029,988 | Schmidt | Apr. 17, 1962 |
| 3,047,195 | Richmond | July 31, 1962 |

FOREIGN PATENTS

| | | |
|---|---|---|
| 316,997 | Switzerland | Oct. 31, 1956 |